United States Patent [19]
Reigler et al.

[11] 3,832,407
[45] Aug. 27, 1974

[54] PREPARATION OF BERYLLIUM HYDRIDE ETHERATE

[75] Inventors: Paul F. Reigler, Midland; Lz F. Lamoria, Bay City, both of Mich.

[73] Assignee: The Dow Chemical Company, Midland, Mich.

[22] Filed: Mar. 2, 1965

[21] Appl. No.: 437,637

[52] U.S. Cl. .......... 260/615 B, 260/615 R, 423/645
[51] Int. Cl. ............................................ C07c 43/30
[58] Field of Search .......... 23/204; 260/665, 615 B, 260/615 R; 423/645

[56] References Cited
OTHER PUBLICATIONS

Wood et al., Electrodeposition of Metals from Organic Solutions, In J. Electrochem. Soc. Vol. 104, p. 29–37, 1957.

*Primary Examiner*—Benjamin R. Padgett
*Assistant Examiner*—R. E. Schafer
*Attorney, Agent, or Firm*—C. Kenneth Bjork; William M. Yates

[57] ABSTRACT

Beryllium Hydride Etherate is prepared by reacting a solution of Sodium Aluminum Hydride and a solution of Beryllium Borohydride in a liquid Ether material.

4 Claims, No Drawings

PREPARATION OF BERYLLIUM HYDRIDE ETHERATE

This invention relates to a method for preparing light metal hydrides and more particularly is concerned with a novel process for preparing beryllium hydride.

The present novel process in general comprises reacting sodium aluminum hydride ($NaAlH_4$) and beryllium borohydride [$Be(BH_4)_2$] in the presence of an inert solvent under substantially anhydrous conditions. Beryllium hydride precipitates directly in the reaction medium and readily is separated therefrom. It is unexpected that sodium aluminum hydride and beryllium borohydride should react to provide beryllium hydride, since heretofore in the art sodium aluminum hydride has never been shown to be operative in the preparation of beryllium hydride.

Lithium aluminum hydride conventionally has been used heretofore as a reactant. The present novel process therefore provides the additional unexpected economic advantage that a relatively inexpensive reactant, sodium aluminum hydride, can be used instead of expensive lithium aluminum hydride.

In actual practice of the process of the present invention, sodium aluminum hydride and beryllium borohydride are reacted in diethylene glycol dimethyl ether, tetrahydrofuran or mixtures of these solvents at a temperature of from about room temperature up to the boiling point of the reaction mixture, preferably at a temperature of from about 25° C. to about 65° C., the ratio of $Be(BH_4)_2/NaAlH_4$ on a gram mole basis ranging from about 0.5 to about 1 or more. The beryllium hydride product precipitates in the reaction mass and is separated therefrom.

In a preferred embodiment of the invention, a tetrahydrofuran solution of beryllium borohydride, which is substantially free from insoluble matter, is added slowly with stirring at about room temperature, i.e. about 18°–25° C. to a diethylene glycol dimethyl ether solution of sodium aluminum hydride which also is substantially free from insolubles, in an amount providing $Be(BH_4)_2/NaAlH_4$ in a gram mole ratio of from about 0.5 to about 0.75.

The resulting beryllium hydride product precipitates almost instantaneously as the reactants are mixed. Ordinarily, the reaction mass is agitated for a minimum period of about 2 minutes after completion of the mixing of the reactants to assure substantial completion of the reaction although this is not critical.

Following the reaction period, the precipitated beryllium hydride product is separated from the reaction mass, ordinarily by filtration.

The resulting solid beryllium hydride product usually is washed with an ether, for example, tetrahydrofuran, diethyl ether, isopropyl ether and the like. This removes any excess reactants and other ether soluble impurities therefrom. The so-washed product can be dried in an inert atmosphere and a moderately elevated temperature, i.e. up to a maximum of about 85° C. if desired. Usually the drying step is carried out at a reduced pressure.

The present process is carried out under substantially anhydrous conditions in an inert atmosphere, such as nitrogen or argon, for example.

Ordinarily the process is carried out at atmospheric pressure. However, superatmospheric pressures can be employed if desired.

Solvents suitable for use in the process are those liquid materials inert to the reactants and products in which the beryllium borohydride and sodium aluminum hydride reactants are soluble but in which beryllium hydride is substantially completely insoluble. As set forth hereinbefore, diethylene glycol dimethyl ether is a preferred solvent for the sodium aluminum hydride and tetrahydrofuran for the beryllium borohydride although either tetrahydrofuran or diethylene glycol dimethyl ether can be used alone as solvent in the process. The quantities of solvent to be used in preparing the reactant solutions are not critical except that at a minimum the amount must be such that the reactants are completely dissolved therein. Maximum amounts of solvent to be used ordinarily are limited to those volumes such that the reaction mixture does not become unduly bulky and unwieldly to handle both during the initial reaction and subsequent solid-liquid separation, solvent removal and the like operations. Conveniently solutions ranging from about 0.05 to about 0.5 molar in reactant solute concentration are employed.

The solutions of sodium aluminum hydride and beryllium borohydride can be used as prepared. However, for obtaining optimum yields and the highest purity products usually the reactant solutions are filtered or otherwise treated prior to mixing to remove insoluble matter therefrom.

The beryllium borohydride reactant readily can be prepared by reacting beryllium chloride and sodium borohydride in the solid state. High purity reactants, i.e. beryllium borohydride and sodium aluminum hydride are preferred to assure a minimum of impurities in the final product.

The following Example will serve to further illustrate the present invention but is not meant to limit it thereto.

EXAMPLE

About 2.7 grams of sodium aluminum hydride (~0.05 gram mole) was dissolved in about 200 cubic centimeters of diethylene glycol dimethyl ether previously distilled from sodium aluminum hydride. The resulting solution was filtered. To this solution was added with constant stirring at a reaction temperature of about 25° C., a solution of about 1.0 gram of beryllium borohydride (~0.026 gram mole) dissolved in about 100 cubic centimeters of substantially anhydrous tetrahydrofuran. This provided a $Be(BH_4)_2/NaAlH_4$ gram mole ratio of about 0.52. As the beryllium borohydride solution contacted the sodium aluminum hydride solution, a white precipitate formed almost instantaneously. The reaction mixture was stirred for three minutes after completion of the mixing operation and the white precipitate then collected by filtration on a medium sintered glass frit. The precipitated product was washed once with fresh tetrahydrofuran. All of these manipulative operations, including the initial preparation of the reaction solutions, were carried out under a substantially anhydrous nitrogen atmosphere in an inert atmosphere box. The resulting partially dried product was removed from the inert atmosphere box and heated at about 83° C. for about 2.5 hours under reduced pressure.

X-ray diffraction analysis indicated the product was amorphous. Elemental chemical analysis showed carbon 34.9 percent; hydrogen 10.2 percent and beryllium 21.0 percent. This corresponds to a beryllium hydride diethylene glycol dimethyl etherate having a composition corresponding approximately to BeH$_2$·0.22C$_6$H$_{14}$O$_3$.

By following the same general procedure as described directly hereinbefore in the Example, beryllium hydride can be prepared utilizing Be(BH$_4$)$_2$/NaAlH$_4$ reactants in gram mole ratios of from about 0.5 to about 1 and carrying out the reaction at temperatures of from about 25° to about 65° C.

Various modifications can be made in the present invention without departing from the spirit or scope thereof for it is understood that we limit ourselves only as defined in the appended claims.

We claim:

1. A novel process for preparing beryllium hydride etherates which comprises;
   a. reacting in an inert atmosphere a solution of beryllium borohydride and a solution of sodium aluminum hydride and precipitating beryllium hydride etherate in the resulting mixture, the ratio of beryllium borohydride to sodium aluminum hydride in the reaction mixture on a gram mole basis ranging from about 0.5 to about 1, the solvent for said beryllium borohydride and said sodium aluminum hydride reactants being a liquid ether material inert to said reactants and products and being substantially a non-solvent for beryllium hydride, and
   b. separating said solid beryllium hydride etherate from the reaction mass.

2. A process for preparing beryllium hydride diethylene glycol dimethyl etherate which comprises;
   a. adding in an inert atmosphere a tetrahydrofuran solution of beryllium borohydride to an agitated diethylene glycol dimethyl ether solution of sodium aluminum hydride at a temperature of from about 25° to about 65° C., the beryllium borohydride/sodium aluminum hydride ratio of said reactants on a gram mole basis ranging from about 0.50 to about 0.75,
   b. precipitating beryllium hydride diethylene glycol dimethyl etherate directly in the reaction mixture, and
   c. separating the solid beryllium hydride diethylene glycol dimethyl etherate from the residual reaction mass.

3. The process as defined in claim 2 wherein the beryllium borohydride/sodium aluminum hydride ratio of the reactants on a gram mole basis is about 0.52 and the beryllium borohydride solution is added to the sodium aluminum hydride solution at a temperature of about 25° C.

4. The process as defined in claim 2 and including the steps of washing the separated beryllium hydride diethylene glycol dimethyl etherate product and drying said product at a moderately elevated temperature and reduced pressure.

* * * * *